United States Patent
Busch et al.

(10) Patent No.: US 9,505,482 B2
(45) Date of Patent: Nov. 29, 2016

(54) FACING ARRANGEMENT AND AIRCRAFT OR SPACECRAFT

(75) Inventors: Heinz-Peter Busch, Weyhe (DE); Berend Schoke, Twistringen (DE)

(73) Assignee: Airbus Operations GmbH, Hamburg (DE)

( * ) Notice: Subject to any disclaimer, the term of this patent is extended or adjusted under 35 U.S.C. 154(b) by 913 days.

(21) Appl. No.: 13/813,609

(22) PCT Filed: Jul. 28, 2011

(86) PCT No.: PCT/EP2011/062967
§ 371 (c)(1),
(2), (4) Date: Apr. 9, 2013

(87) PCT Pub. No.: WO2012/016900
PCT Pub. Date: Feb. 9, 2012

(65) Prior Publication Data
US 2013/0287482 A1   Oct. 31, 2013

Related U.S. Application Data

(60) Provisional application No. 61/370,218, filed on Aug. 3, 2010.

(30) Foreign Application Priority Data

Aug. 3, 2010 (DE) .................. 10 2010 038 823

(51) Int. Cl.
*B64C 1/06* (2006.01)
*F16B 5/00* (2006.01)
*F16B 21/09* (2006.01)

(52) U.S. Cl.
CPC ............ *B64C 1/06* (2013.01); *B64C 1/066* (2013.01); *F16B 5/0036* (2013.01); *F16B 5/0068* (2013.01); *F16B 21/09* (2013.01); *Y10T 403/51* (2015.01)

(58) Field of Classification Search
CPC ........... B66B 11/0226; B66B 11/0253; E04B 1/6116; B62D 25/02; B62D 29/045; B62D 33/046; B62D 33/04; B62D 27/06; F16B 5/0036; F16B 5/0052
See application file for complete search history.

(56) References Cited

U.S. PATENT DOCUMENTS

| 858,547 A | 7/1907 | Thorne |
| 5,655,346 A * | 8/1997 | Holmes ..................... E06B 3/68 52/235 |

(Continued)

FOREIGN PATENT DOCUMENTS

| AU | 621633 | 3/1992 |
| DE | 29717135 | 11/1997 |

(Continued)

OTHER PUBLICATIONS

German Office Action, Feb. 17, 2014.

*Primary Examiner* — Daniel Wiley
(74) *Attorney, Agent, or Firm* — Greer, Burns & Crain Ltd.

(57) ABSTRACT

A facing arrangement for a hold of an aircraft or spacecraft. The facing arrangement comprises a first and a second panel which form a gap between them; a first mounting part which is to be attached to a primary structure of the hold and which has at least one locking arrangement, and a second mounting part which has at least one counter locking arrangement. The locking arrangement and/or the counter locking arrangement passing, at least in portions, through the gap between the first and the second panel. The locking arrangement and the counter locking arrangement being locked together in order to connect the first mounting part to the second mounting part for holding the first and second panels between the first mounting part and the second mounting part.

19 Claims, 9 Drawing Sheets

(56) References Cited

U.S. PATENT DOCUMENTS

| | | | | |
|---|---|---|---|---|
| 5,758,988 | A * | 6/1998 | Theodorou | F16B 5/0036 160/135 |
| 7,478,781 | B2 * | 1/2009 | Granzeier | B60R 13/02 244/130 |
| 7,500,713 | B2 * | 3/2009 | Riley | B62D 33/046 296/186.1 |
| 8,006,386 | B2 * | 8/2011 | Ehrlich | B62D 33/023 29/897.2 |
| 2007/0200393 | A1 | 8/2007 | Riley et al. | |
| 2009/0026215 | A1 | 1/2009 | Roush et al. | |
| 2009/0050741 | A1 | 2/2009 | Muller | |

FOREIGN PATENT DOCUMENTS

| | | |
|---|---|---|
| EP | 0744506 | 11/1996 |
| EP | 1647480 | 4/2006 |
| WO | 2007128427 | 11/2007 |

* cited by examiner

Fig. 3D (II - II)

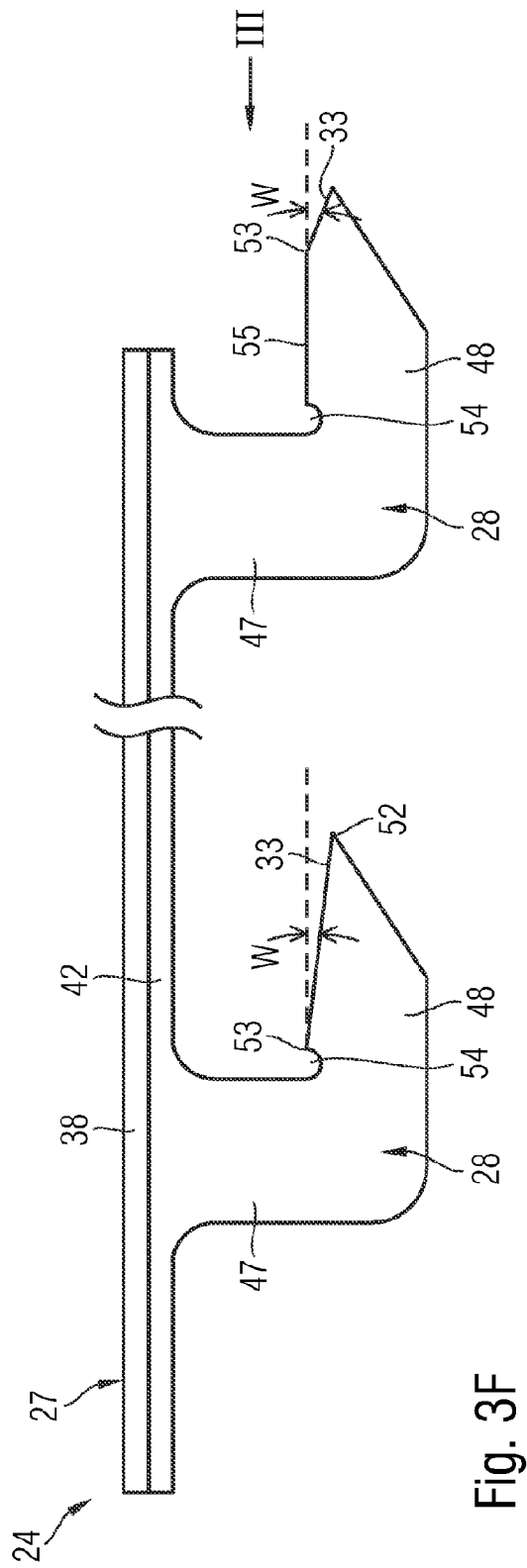
Fig. 3F
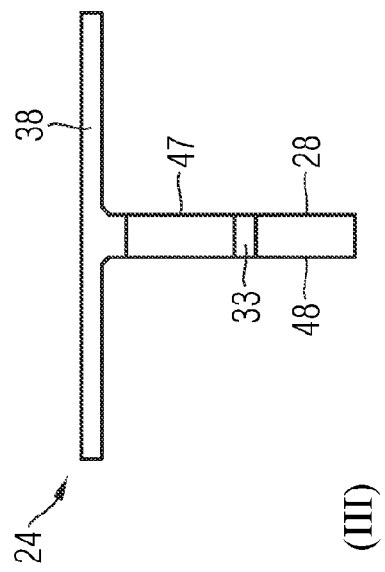
Fig. 3G  (III)

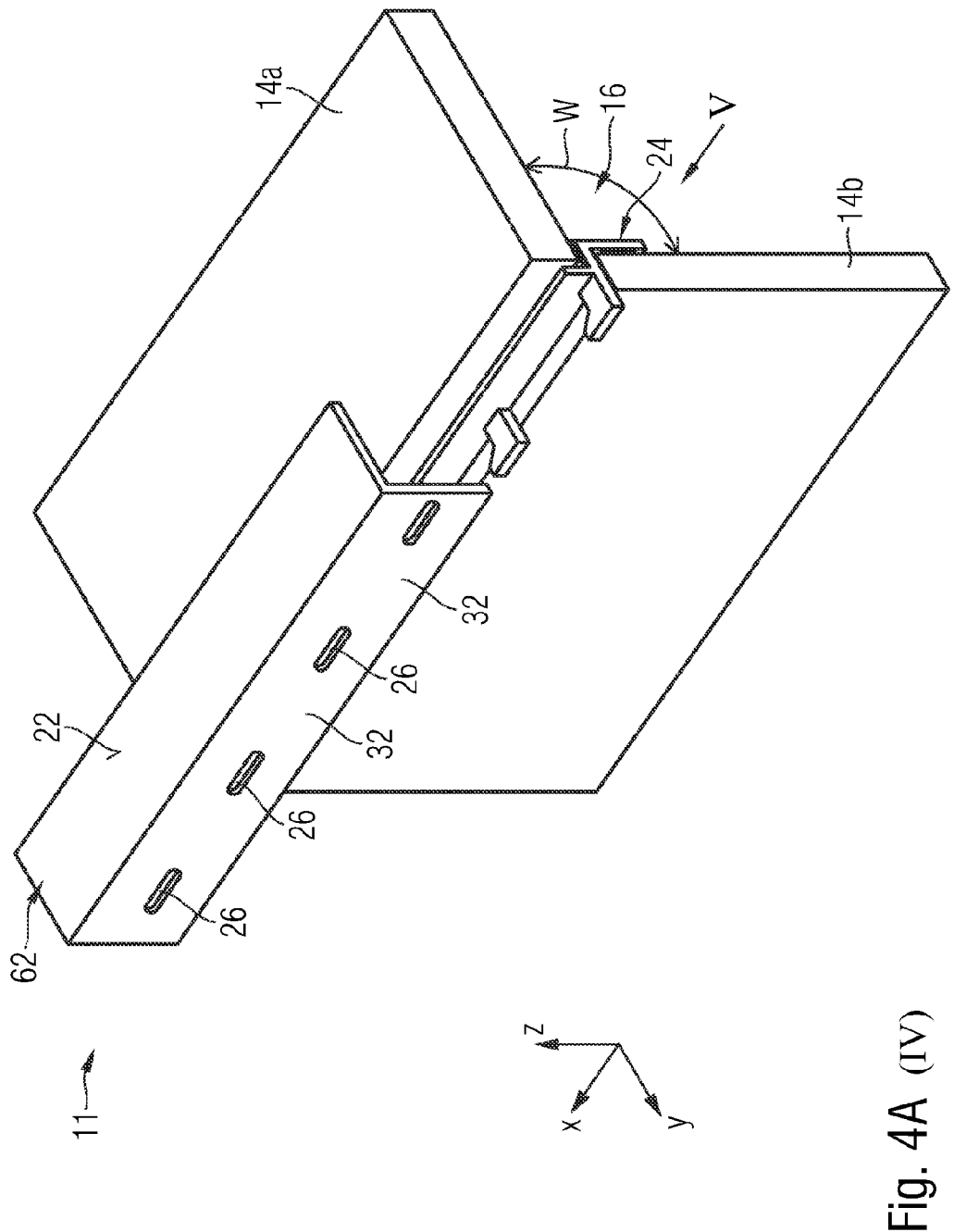
Fig. 4A (IV)

Fig. 5A (VI)

FACING ARRANGEMENT AND AIRCRAFT OR SPACECRAFT

CROSS-REFERENCES TO RELATED APPLICATIONS

This application claims benefit of the U.S. Provisional Application No. 61/370,218 filed on Aug. 3, 2010, and the German patent application No. 10 2010 038 823.8, filed Aug. 3, 2010, the entire disclosures of which are incorporated herein by way of reference.#

FIELD OF THE INVENTION

The present invention relates to a facing arrangement for a hold of an aircraft or spacecraft and to an aircraft or spacecraft.

BACKGROUND OF THE INVENTION

Although applicable to any aircraft or spacecraft as well as any space, the present invention as well as the problem on which it is based are explained in more detail in relation to a hold for an aircraft.

FIG. 1 shows a perspective view of a detail of a facing arrangement 1 which lines a hold 2 of an aircraft, generally indicated as 3 and not shown further. The facing arrangement 1 has a plurality of panels 4 made of a sandwich material. The sandwich material is indicated by hatching on the edges of some of the panels 4. The panels 4 are fastened to mounting parts 6 by means of a large number of screws 5. The mounting parts 6 are attached in turn to the primary structure (which is not shown in FIG. 1, however) of the aircraft 3, for example, to formers. The mounting parts 6 are formed as elongate profiled parts which extend, in particular, in the longitudinal direction X and vertical direction Z of the aircraft 3, so that a type of lattice structure results, which is not shown in FIG. 1, however.

Since spot loads are introduced in the edge regions of the panels 4 via the screws 5, the panels must be reinforced by insets 7. By way of example, this is shown in dashed lines in FIG. 1 for only one of the screws 5. The insets 7 must already be integrated into the respective sandwich material during construction thereof, i.e. before the sandwich material is cured.

Because of the spot loads which are introduced in the edge regions of the panels 4 via the screws 5, it is further necessary to reinforce the edge regions by means of core filler (not shown).

A facing arrangement which is related to the above-described facing arrangement is known from document DE 41 41 573 A1. DE 41 41 573 A1 describes an apparatus for the detachable fixing of facing panels to a secondary structure of an aircraft, locking elements being pushed through a guide bushing in a facing panel.

In practice, the above-described solutions have proved disadvantageous in many respects:

Setting the screws 5 takes a comparatively long time and is combined with correspondingly positioning each screw 5 opposite a corresponding hole in a respective panel 4. This requires a comparatively complex assembly process.

Furthermore, the insets 7 and the core filler (not shown) must be provided, which makes the production process for the panels 4 complex. The same is true for the guide bushings described in DE 41 41 573 A1.

In addition, because of the holes for the screws 5, the insets 7 and the core filler, the dimensioning for a finished panel 4 is predetermined. This means that if it is unexpectedly found that a differently dimensioned panel 4 is required in a certain place, a separate panel 4 must be manufactured for this, and a panel which has already been produced cannot be adapted accordingly. The same is true for the facing panels described in DE 41 41 573 A1.

Furthermore, for example, during maintenance of the aircraft 3, in particular if it is found that one of the panels 4 is damaged, it is necessary to replace the corresponding panel 4. For this, however, a large number of screws 5 must be loosened, which is comparatively labour-intensive and time-consuming

SUMMARY OF THE INVENTION

One idea of the present invention is, therefore, to provide a facing arrangement and/or an aircraft or spacecraft which at least reduces the above-described disadvantages and simultaneously meets the requirements set by the aviation authorities.

Accordingly, a facing arrangement for a hold of an aircraft or spacecraft is provided, which has the following: a first and a second panel which form a gap between them; a first mounting part which is attachable to a primary structure of the hold and which has at least one locking means; and a second mounting part which has at least one counter locking means; the locking means and/or the counter locking means reaches, at least in portions, through the gap between the first and the second panel; and the locking means and the counter locking means locking together in order to connect the first mounting part to the second mounting part for holding the first and second panels between the first mounting part and the second mounting part.

Furthermore, an aircraft or spacecraft is provided which has a hold and the facing arrangement according to the invention, which facing arrangement lines the hold.

The underlying idea of the present invention consists in providing a locking means and a counter locking means in lieu of the initially described, known screws. Locking can be carried out much more quickly than screwing.

Furthermore, because the locking means and/or the counter locking means pass, at least in portions, through the gap between the first and the second panel, the complex provision of holes in the panels can be avoided. Thus a panel which has already been produced can also be easily dimensioned differently, for example Furthermore, the panels are held by the mounting parts, whereby a spot loading of the panels in the edge region thereof is avoided. As a result, corresponding insets and the use of a core filler, as described in the introduction, can be dispensed with.

Advantageous configurations and developments of the invention emerge from the subclaims.

According to a preferred development of the facing arrangement according to the invention, the first and second mounting parts hold the first and second panel between them with friction locking and/or positive locking. Preferably, the locking means and the counter locking means are configured in such a way that the first and second mounting parts are braced against each other. This means that the first and second panels, which are arranged between the first and second mounting parts, are compressed between the mounting parts. Thus, the desired frictional locking between the mounting parts and the panels can be easily created. A positive locking can be provided in that the panels are gripped in their edge regions by the first and/or second mounting part.

According to a further preferred development of the facing arrangement according to the invention, the locking means and counter locking means are provided so as to be detachably lockable. "Detachably lockable" means that the connection between the locking means and the counter locking means can be released. Thus, the panels can be easily removed for maintenance purposes.

According to a further preferred development of the facing arrangement according to the invention, the locking means is formed as an aperture, in particular as a slot, and the counter locking means is formed as a hook which engages, from behind, an edge region bordering the aperture. Alternatively, the locking means can be formed as a keyhole-shaped aperture and the counter locking means can be formed as a shaft with a head, the head engaging, from behind, an edge region bordering the aperture. As a further alternative, the locking means and counter locking means are formed as two interlocking hooks. Such locking means and counter locking means can be easily produced. Furthermore, if a large number of these locking means and counter locking means are provided, these can all be locked together or unlocked from each other, i.e. detached, by means of a single movement.

According to a further preferred development of the facing arrangement according to the invention, the first and the second mounting parts each have a first contact face for the first panel and/or a second contact face for the second panel, between which contact faces the first and second panels are held. In particular, by providing the first and/or second contact face, it can be ensured that no spot loads are introduced in the edge regions of the panels, but rather, that only a planar pressure is exerted on the panels.

According to a further preferred development of the facing arrangement according to the invention, the first mounting part is formed as a U-profile or an angle profile which has on one portion the at least one locking means and/or, on this portion and/or on the portion adjoining this portion, the first and/or second contact face. "Portion", in the present case, means a web or arm of a respective profiled part.

According to a further preferred development of the facing arrangement according to the invention, the second fixing part is formed as an angle profile which has, on one arm, the first contact face and/or the locking means and/or, on its other arm, the second contact face. The angle between the arms of the angle profile can be between 0 and 180°, preferably between 30 and 150°.

According to a further preferred development of the facing arrangement according to the invention, a portion, in particular a web, is formed on the first and/or second mounting part for positioning the first and/or second panel in its main plane extension. Such a portion or web facilitates the positioning of the first and second panels relative to one another during assembly of the facing arrangement.

According to a further preferred development of the facing arrangement according to the invention, a seal is arranged between the first and/or second contact face of the first and/or second mounting part and the first and/or second panel. In this way, the gap between the first and second panels can be easily sealed. Thus, in the case of a fire, poisonous gases are prevented from passing through the gap, and the fire can thus be put out in the hold.

According to a further preferred development of the facing arrangement according to the invention, a securing means is provided which prevents the locking means and counter locking means from unlocking. For example, a movement of the hook with respect to the edge region which the hook engages from behind can thus be prevented, which in turn prevents the hook from disengaging from the edge region.

According to a further preferred development of the facing arrangement according to the invention, the securing means is formed as a piece which is arranged adjacently to the second mounting part in a longitudinal direction thereof, the second mounting part together with the piece having the same length as the first mounting part. For example, locking the hook to the edge region of the aperture can require moving the second mounting part substantially parallel to the first mounting part. However, such a movement can be limited because of a wall, cover or the like. This problem can be resolved by the second mounting part being formed shorter than the first mounting part, the piece then being inserted after the second mounting part has been locked to the first mounting part, in order to complete the second mounting part on the one hand, and thus close the gap between the first and second panels, and on the other hand, to fix the second mounting part with respect to the first mounting part.

For this purpose, the piece is preferably detachably fastenable to the second mounting part.

According to a further preferred development of the facing arrangement according to the invention, the first and/or second mounting part comprises a plastics material, in particular a fibre reinforced plastics material, as well as a fire-retardant material which protects the plastics material from a fire in the hold. Of course, it is also conceivable to use an aluminium material, for example, instead of the plastics material. However, plastics material, in particular fibre reinforced plastics material has the advantage that it has only a low weight. The plastics material can be protected from a fire, and therefore from being destroyed, by means of the fire-retardant material.

According to a further preferred development of the facing arrangement according to the invention, the fire-retardant material is formed as an intumescent coating, a ceramic coating or a mica coating. This means that, according to this development, a main body of the first and/or second mounting part is produced from plastics material which is coated with a coating of fire-retardant material. This coating of fire-retardant material preferably faces the interior of the hold.

BRIEF DESCRIPTION OF THE DRAWINGS

The invention is explained in more detail below by way of embodiments with reference to the attached figures of the drawings, in which:

FIG. 3D is a section II-II from FIG. 3A;

FIG. 3F is an enlarged lateral view from FIG. 3C;

FIG. 3G is a view III from FIG. 3F;

FIG. 4A is an enlarged view IV from FIG. 2, rotated nearly 180°, in which a first mounting part having been removed;

FIG. 5A is a perspective view of a second mounting part from a view VI from FIG. 2.

In the figures, like reference numerals denote like or functionally equivalent components, where nothing is stated to the contrary.

In the figures, the X axis indicates the aircraft's longitudinal axis, the Y axis indicates the aircraft's lateral axis and the Z axis indicates the aircraft's vertical axis.

DETAILED DESCRIPTION OF THE PREFERRED EMBODIMENTS

Figure 1:
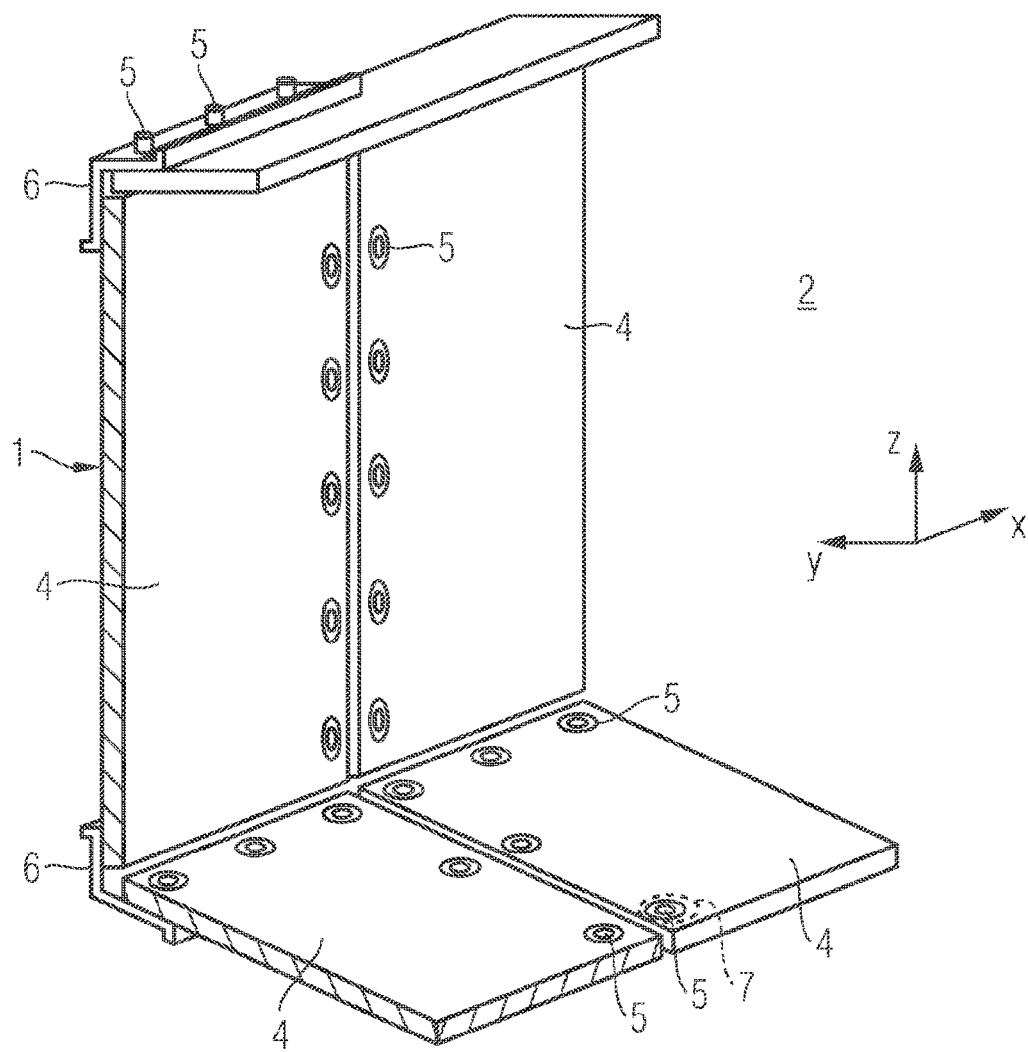
FIG. 1 is a perspective view of a detail of an exemplary facing arrangement.
Figure 2:
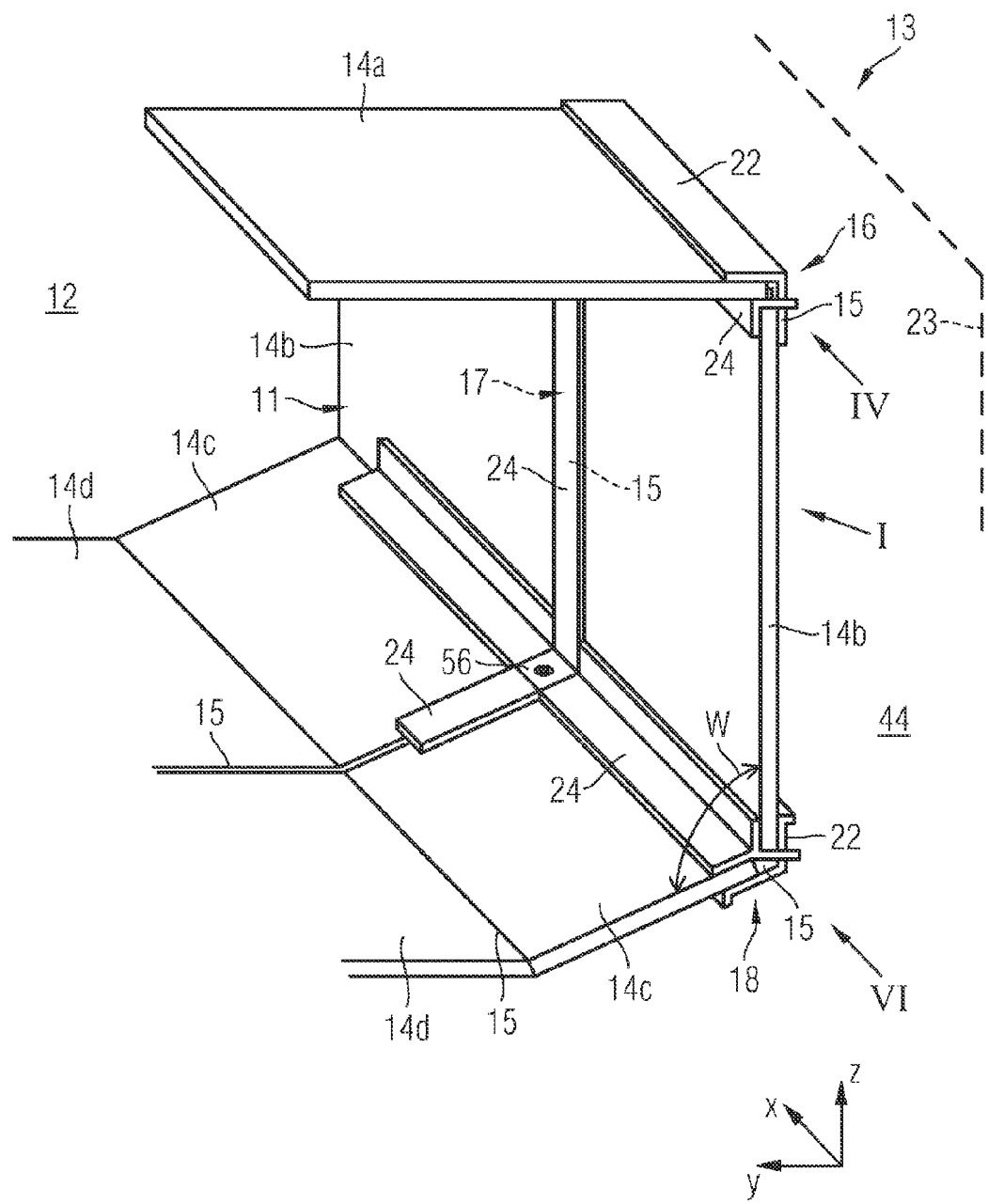
FIG. 2 is a perspective view of a detail of facing arrangement according to an embodiment of the present invention.

FIG. 2 shows a perspective view of a detail of a facing arrangement 11 which lines a hold 12 of an aircraft, generally indicated as 13 and not shown further.

The facing arrangement 11 has a plurality of panels 14a, 14b, 14c, 14d which are preferably made of a sandwich material. The panels 14a-14d adjoin each other in their respective edge regions, two of the panels 14a-14d respectively forming a gap 15 between them. Furthermore, the panels 14a-14d together form different joint configurations. In this way, a cover panel 14a, for example, forms an approximately right-angled joint 16 with a side panel 14b. The side panels 14b abut each other in turn in a butt joint 17. The side panels 14b abut obliquely arranged panels 14c at an angle W of 135°, for example. The joint thus formed is labelled in the present case as oblique joint 18.

A respective first mounting part 22 is provided in the region of the respective joints 16, 17, 18. The first mounting part 22 is firmly attached to a primary structure 23 of the aircraft 13, which primary structure is only shown schematically and is associated with the hold 12. The primary structure 23 involves stringers or formers, for example. "Primary structure" means, in the present case, the bearing structure of the hold 12 or of the aircraft 13.

Furthermore, a second mounting part 24 is provided in the region of each of the joints 16, 17, 18. The second mounting parts 24 are respectively locked together with the first mounting parts 22 in a manner which is described in more detail at a later point. Each pair, comprising a first and a second mounting part 22, 24 holds at least two panels 14a-14d between them. For example, the first and second mounting parts 22, 24 which are associated with the right-angled joint 16 thus hold the cover panel 14a and the side panel 14b between them.

By means of the first and second mounting parts 22, 24, the panels 14a-14d can thus be simply held in a fixed position relative to one another and furthermore can be fixed firmly to the primary structure 23.

The construction in the region of the butt joint 17, where the two side panels 14b meet, will be explained in more detail below with reference to FIGS. 3A-3G.

Figure 3A:
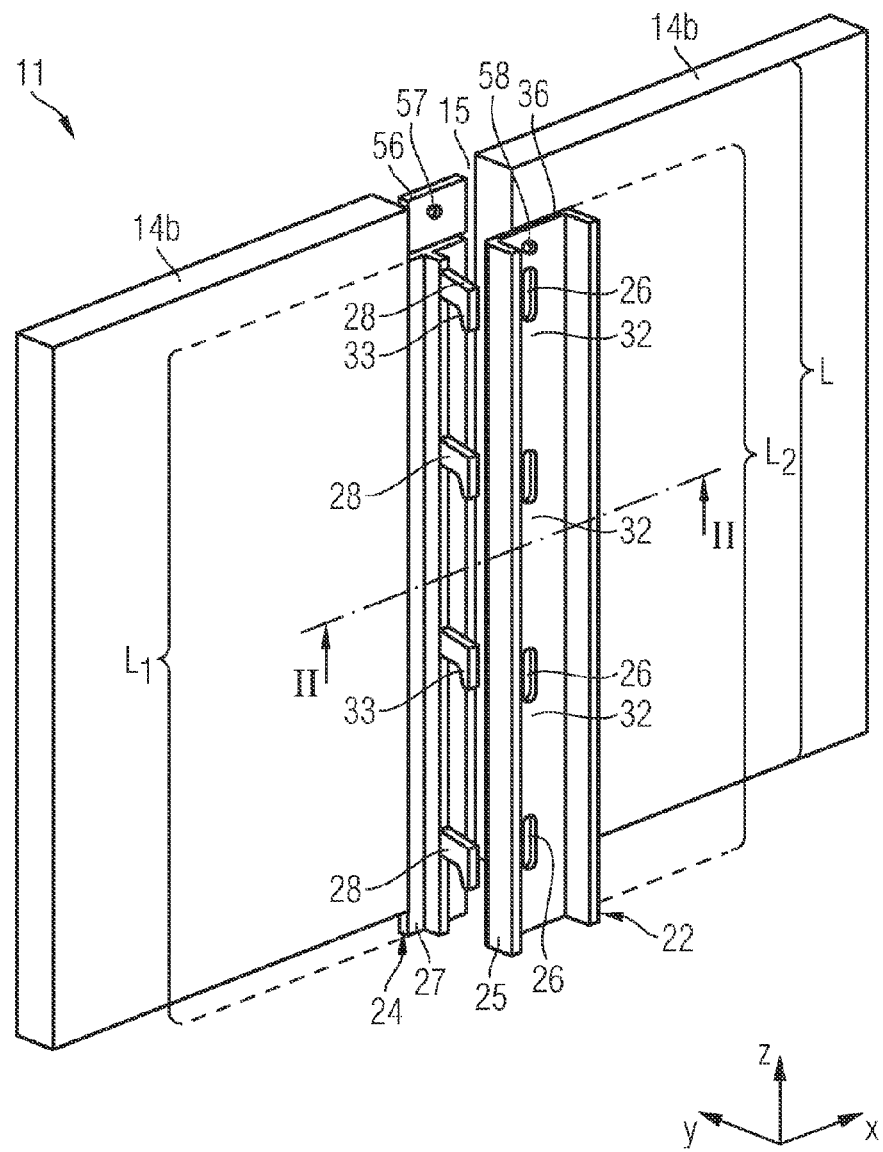
FIG. 3A is an enlarged exploded view I from FIG. 2.

FIG. 3A shows an enlarged exploded view I from FIG. 2.

According to the embodiment according to FIG. 3A, the first mounting part 22 has a U-profile 25, for example, which is provided with a plurality of locking means 26. The locking means 26 are, for example, formed as slots and arranged along the longitudinal direction Z of the U-profile 25, spaced apart from each other.

The second mounting part 24 has, for example, a T-profile 27 which is provided with a plurality of counter locking means 28. The counter locking means 28 are, for example, formed as hooks which are provided along the longitudinal direction Z of the T-profile 27, spaced apart from each other.

In order to lock the first and second mounting parts 22, 24 together, the hooks 28 are pushed through the slots 27 and the second mounting part 24 is moved with respect to the first mounting part 22 in such a way that the hooks 28 engage with the edge regions 32 which border the slots 26, i.e. they engage those from behind This can be clearly seen in FIG. 3D which shows a section II-II from FIG. 3A, the first and second mounting parts 22, 24 being shown locked together. In order to achieve the locking of the hooks 28 to the slots 26 in FIG. 3A, the second mounting part 24 is moved downwards, i.e. counter to the Z direction, with respect to the first mounting part 22. Since the hooks 28 are provided with a bevel 33 (see FIG. 3A), which is described in more detail at a later point, the above-described relative movement between the first and second mounting parts 22, 24, leads to the second mounting part 24 being pulled close to the first mounting part 22, and thus the side panels 14b, which are arranged between the first and second mounting parts 22, 24, are compressed between these. Thus, not only does positive locking occur between the first and second mounting parts 22, 24 and the side panels 14b along the Y axis, i.e. perpendicular to the main plane extension of the side panels 14b, but frictional locking is also achieved between the first and second mounting parts 22, 24 and the side panels 14b in the XZ plane, i.e. in the main plane extension of the side panels 14b. FIG. 3D also shows how the hook 28 of the T-profile 27 passes through the gap 15 and through the slot 26 in the U-profile 25 in order to engage the edge region 32 from behind.

The above-described positive and frictional locking is achieved by means of contact faces 34a, 34b (see FIG. 3D) on the U-profile 25 and contact faces 35a, 35b on the T-profile 27.

Figure 3B:
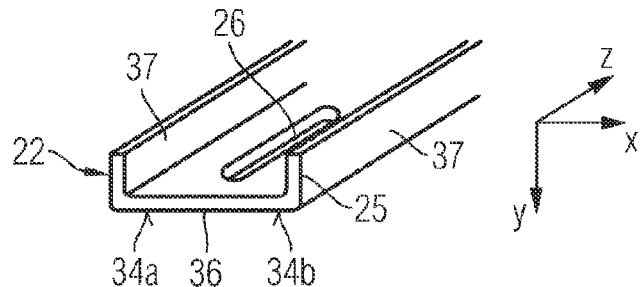
FIG. 3B shows a first mounting part from FIG. 3A.

The position of the contact faces 34a, 34b is explained in more detail below with reference to FIG. 3B, which shows a detail of the first mounting part 22 in a perspective view.

The U-profile 25 of the first mounting part 22 comprises a base portion 36 and portions 37 which extend substantially at a right angle from this at its ends. The base portion 36 has the slots 26. On the side which faces away from the portions 37, the base portion 36 further forms the contact faces 34a and 34b on both sides of the slots 26. In order to achieve as large a contact face as possible, the base portion 36 can be dimensioned larger than the portions 37. "Larger" in this case refers to the extension of the cross section of the base portion 36 along the X axis, whereas "larger" in relation to the portions 37 refers to the extension of cross section thereof along the Y axis.

Figure 3C:
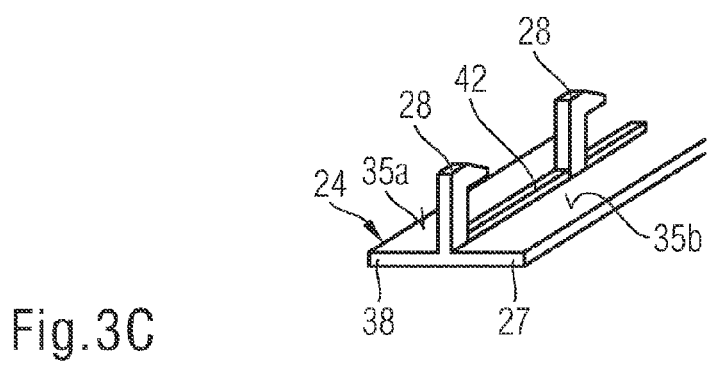
FIG. 3C shows a second mounting part from FIG. 3A.

The position of the contact faces 35a, 35b is explained in more detail below with reference to FIG. 3C which shows a detail of the second mounting part 24 in a perspective view.

The T-profile 27 of the second mounting part 24 comprises a base portion 38 and a web 42 which extends upwards, substantially centrally and approximately at a right angle from this. The hooks 28 are formed on the web 42. The contact faces 35a, 35b are formed on the side of the base portion 38 which faces the hooks 28, and on either side of the hooks 28 or the web 42.

While the contact faces 35a, 35b of the second mounting part 24 according to the present embodiment rest directly against the edge regions 41a, 41b of the side panels 14a and 14b (see FIG. 3D), the contact faces 34a and 34b of the first mounting part 22 rest against the edge regions 41a, 41b of the side panels 14 by means of a seal 43. Thus the hold 12 can be made substantially gas-tight and liquid-tight with respect to a space 44 which encloses the hold 12 (see also FIG. 2). In particular, the passengers in the cabin (not shown) of the aircraft 13 can therefore be protected from fumes in the case of a fire in the hold 12.

It is further shown in FIG. 3D that the second mounting part 24 has a coating 39 which is applied to the base portion 38 of the T-profile 27, on the side which faces into the hold. The coating 39 comprises a fire-retardant material. The material can be, for example, an intumescent, ceramic or mica material. The coating 39 protects the T-profile 27 in the case of a fire in the hold 12. There is therefore the possibility of forming the T-profile 27, for example, from carbon fibre reinforced plastics material which has a lower weight compared with an aluminum material, for example.

Figure 3E:
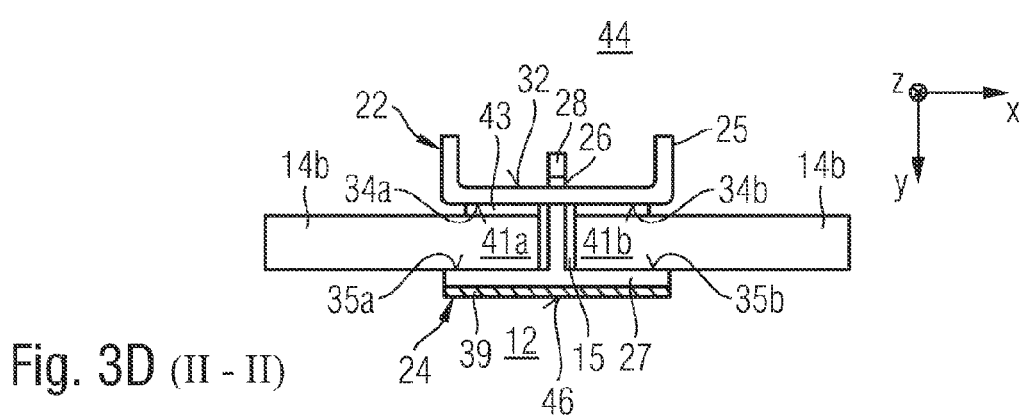
FIG. 3E shows a variation with respect to FIG. 3D.
Figure 3E:
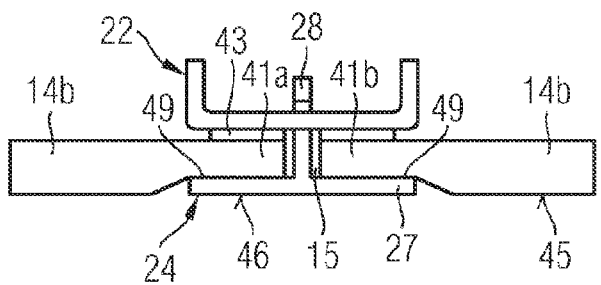

FIG. 3E shows a variation with respect to FIG. 3D which differs from the embodiment according to FIG. 3D in that the second mounting part 24 is embedded in recesses 49 in the edge regions 41a, 41b of the side panels 14b. In this way, a surface 45 of the side panels 14b which faces into the hold can extend substantially flush with a surface 46 of the second mounting part 24 or of the base portion 38 which faces into the hold.

The construction of the hooks 28 is explained in more detail below, with reference to FIG. 3F, which shows the second mounting part 24 from FIG. 3C in a lateral view, and FIG. 3G, which shows a view III from FIG. 3F.

As already mentioned, the hooks 28 have a bevel 33 which ensures that the second mounting part 24 is pulled close to the first mounting part 22 when being locked thereto.

Each of the hooks 28 comprises a portion 47 which extends substantially at a right angle to the base portion 38 of the T-profile 27, and a portion 48 which joins the portion 47 substantially at a right angle. The portion 48 is formed to engage, from behind, the edge region 32 on the U-profile 25 (see FIG. 3A).

The bevel 33 can be formed on the portion 48 in a variety of ways, FIG. 3F showing two different embodiments.

In the embodiment shown to the left of FIG. 3F, the bevel 33 extends from the free end 52 of the portion 48 at an angle W of, for example, approximately 5° towards the portion 47. The end 53 of the bevel 33 can thus join onto the portion 47 via an approximately semicircular notch 54. The semicircular notch 54 is advantageous with regard to manufacturing the hook 28 by means of cutting, in particular milling.

In the embodiment shown to the right of FIG. 3F, the bevel 33 extends at an angle W of, for example, approximately 20° in the direction of the portion 47. In contrast to the embodiment shown to the left of FIG. 3F, an edge 55 which is substantially parallel to the base portion 38 adjoins the end 53, said edge adjoining the portion 47 by means of the semicircular notch 54.

Now returning to FIG. 3A, it can be seen therefrom that the facing arrangement 11 has, furthermore, a securing means in the form of a piece 56. The piece 56 can, for example, be formed as a rectangular plate. The piece 56 is preferably detachably fastened to the first mounting part 22 by means of a screw (not shown) and holes 57, 58. If the piece 56 is fastened to the first mounting part 22, in particular to the base portion 36 thereof, a movement of the second mounting part 24 with respect to the first mounting part 22 along the Z axis is blocked, since the second mounting part 24 abuts the piece 56 along the Z axis. Thus, the hooks 28 cannot disengage from the edge regions 32, which is why the piece 56 prevents the second mounting part 24 from unlocking from the first mounting part 22. If the second mounting part 24 is to be removed from the first mounting part 22 for maintenance purposes, for example, the piece 56 is first removed by unscrewing the corresponding screw. After this, the second mounting part 24 can be moved with respect to the first mounting part 22 along the Z axis, whereby the hooks 28 disengage from the edge regions 32.

Furthermore, the piece 56 has the function of completing the second mounting part 24 in the longitudinal direction Z in order to close the gap 15 over its entire length L. In order also to allow the first and second mounting part 22, 24 to lock together if mobility of the second mounting part 24 along the Z axis is restricted, as is the case here because of the cover plate 14a (see FIG. 2), consideration is given to providing the second mounting part 24 with a length L1 which is less than the length L of the gap 15 to be covered, and less than a length L2 of the first mounting part 22. Preferably, the length L2 of the first mounting part 22 corresponds to the length L of the gap.

Figures 3H, 3I:
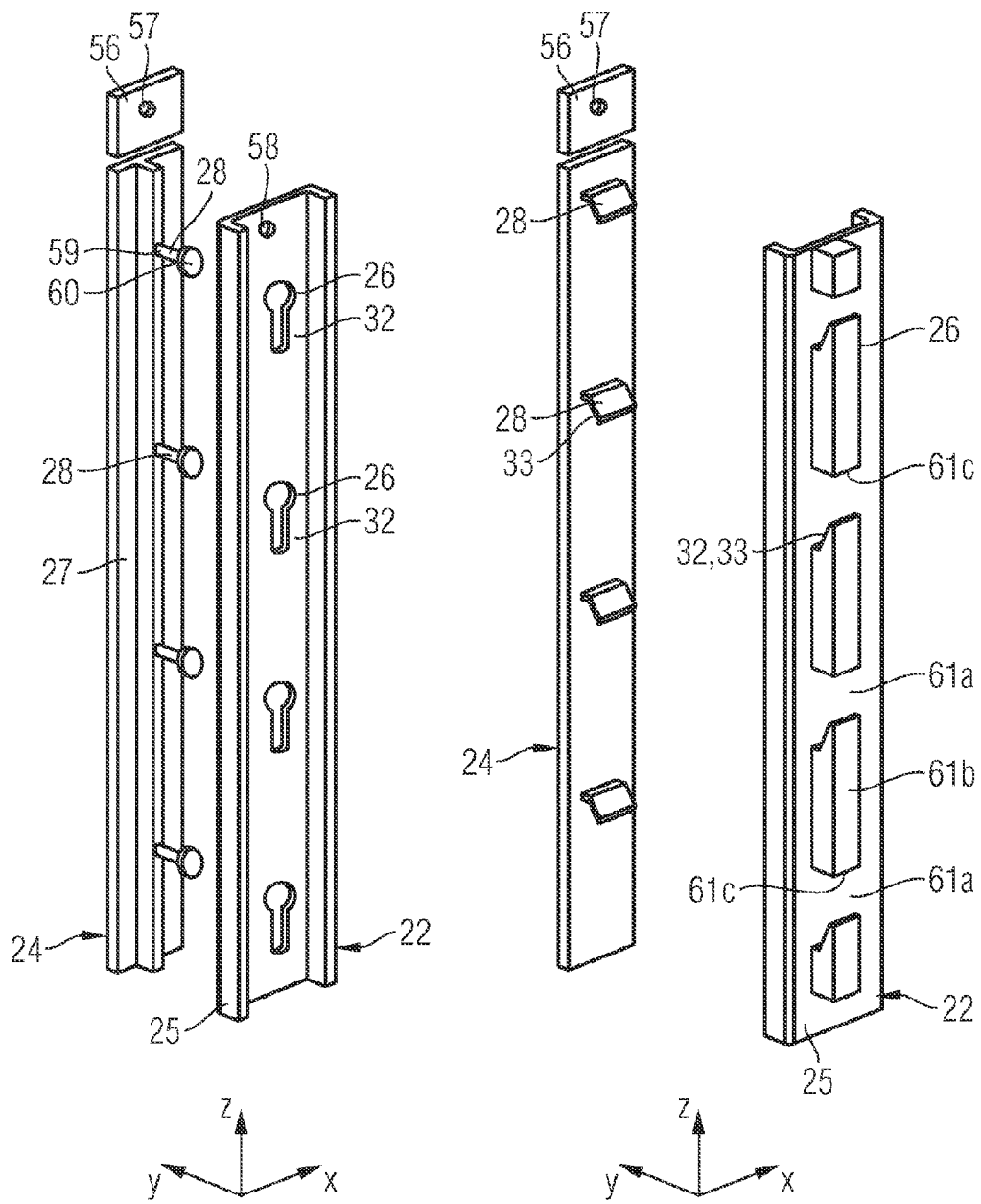
FIG. 3H is a perspective view of the first and second mounting parts from FIG. 3A in a first configuration as an alternative to FIG. 3A.
FIG. 3I is a perspective view of the first and second mounting parts from FIG. 3A in a second configuration as an alternative to FIG. 3A.

FIG. 3H shows a perspective view of the first and second mounting parts 22, 24 from FIG. 3A in a first configuration as an alternative to FIG. 3A. Only the differences with respect to the embodiment according to FIG. 3A will be addressed below.

In the embodiment according to FIG. 3H, the locking means 26 is formed as an approximately keyhole-shaped recess and the counter locking means 28 is formed as a shaft 59 with a head 60 attached thereto.

In order to lock together the locking means and counter locking means, the head 60 is pushed through the keyhole-shaped recess 26 and locked to the edge region 32 surrounding it, in that the second mounting part 24 is moved with respect to the first mounting part 22 along the Z axis (downwards in FIG. 3H).

FIG. 3I shows a perspective view of the first and second mounting parts 22, 24 from FIG. 3A in a second configuration as an alternative to FIG. 3A. The first mounting part 22 is shown rotated 180° about the Z axis with respect to FIG. 3A, in order to give a view of the locking means 26. Only the differences with respect to the embodiment according to FIG. 3A are addressed below.

In the embodiment according to FIG. 3I, the locking means 26 is formed as a first hook and the counter locking means 28 is formed as a second hook.

In order to lock together the locking means and counter locking means, the first and second hooks 26, 28 are engaged with each other. The hooks 26, 28 can respectively have the bevel 33, which has already been explained in connection with FIG. 3A, for bracing the mounting parts 22, 24.

The hooks 26 can, for example, be made such that corresponding recesses 61a are provided in a web 61b. This has the advantage that the hooks 28 engage with the hooks 26 downwards along the Z axis, and abut a stop 61c upwards along the Z axis, so that the movement of the hooks 26 and 28 relative to one another is restricted to the necessary degree for bringing them into engagement with one another and detaching them from one another again.

The construction of the butt 16 is explained in more detail below in connection with FIGS. 4A-4D, the cover plate 14a adjoining the side plate 14b at an angle W of approximately 90°.

FIG. 4A shows enlarged and in perspective a detail of a view IV from FIG. 2, in a view reflected about the Z axis.

Only the differences with respect to the embodiments explained in connection with FIGS. 3A-3I are addressed below.

According to the embodiment according to FIG. 4A, the first mounting part 22 has an angle bracket 62 which is provided with the plurality of slots 26. The first mounting part 22 is shown in FIG. 4A unlocked from the second mounting part 24, in order to give a view of said second mounting part. The second mounting part 24 likewise has an angle bracket 63 which is provided with the hooks 28.

Figure 4B:
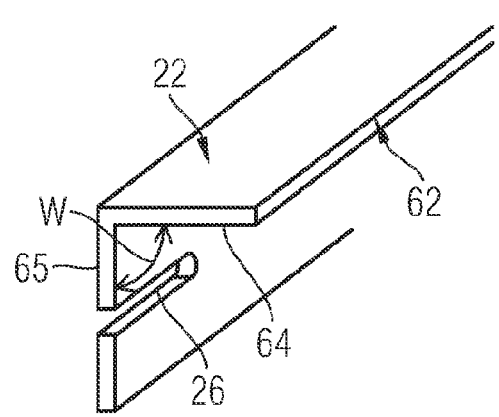
FIG. 4B shows the first mounting part from FIG. 4A.

The construction of the first mounting part 22 is explained in more detail below with reference to FIG. 4B which shows a detail of the first mounting part 22 in a perspective view.

The angle bracket 22 comprises two arms 64 and 65 which adjoin each other at an angle W of approximately 90°. The slots 26 are provided in the arm 65.

Figure 4C:
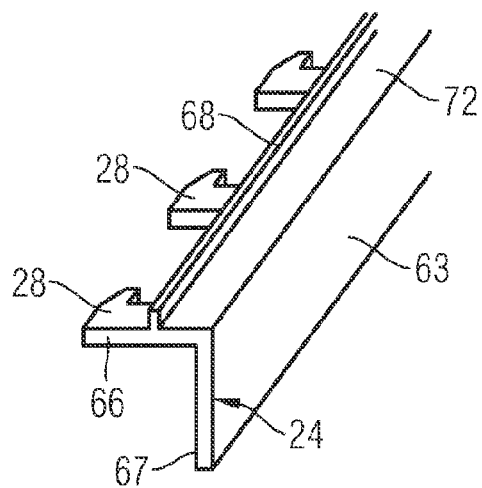
FIG. 4C shows a second mounting part from FIG. 4A.

The construction of the second mounting part 24 is briefly explained below in connection with FIG. 4C which shows a detail of the second mounting part 24 in a perspective view.

The angle bracket 63 of the second mounting part 24 comprises two arms 66 and 67 which adjoin each other at an angle W of approximately 90°. The hooks 28 are integrally formed on the free end of the arm 66. Furthermore, a web 68 is formed on the arm 66, the web extending approximately parallel to the arm 67 from the side 72 of the arm 66, which side faces away from the arm 67.

Figure 4D:
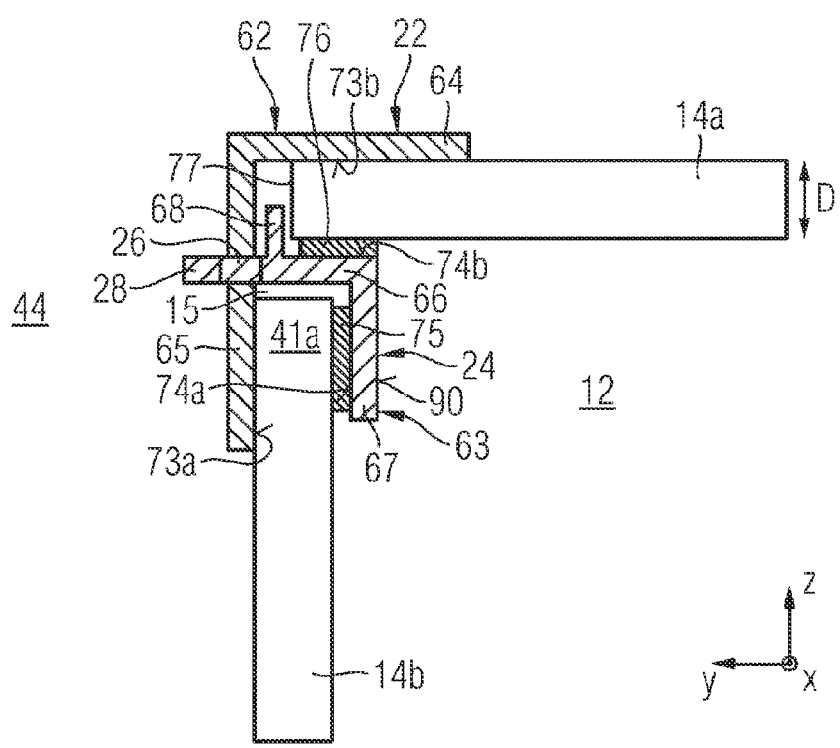
FIG. 4D is a view V from FIG. 4A.

FIG. 4D shows a view V from FIG. 4A.

It can be seen with reference to FIG. 4D, that, when the first and second mounting parts 22, 24 are locked, the side panel 14b is held with positive locking between a contact face 73a of the arm 65 of the first mounting part 22 and a contact face 74a of the arm 63 of the second mounting part 24 along the Y axis, i.e. substantially perpendicular to the main plane extension of the side panel 14b. Furthermore, the side panel 14b is held with friction locking between the contact faces 73a and 74a in the XZ plane, i.e. substantially in the main plane extension of the side panel 14b. The contact face 74a can act on the edge region 41a of the side panel 14b, by means of a seal 75.

The cover panel 14a is held between a contact face 73b of the arm 64 of the first mounting part 22 and a contact face 74b of the arm 66 of the second mounting part 24. Thus, on the one hand, the cover panel 14a is held with positive locking along the Z axis, i.e. substantially perpendicular to the main plane extension of the cover panel 14a. Furthermore, the side panel 14a is held with friction locking between the contact faces 73b and 74b in the XY plane, i.e. substantially in the main plane extension. The contact face 74b of the arm 66 of the second mounting part 24 can act on the edge region 41b of the cover panel 14a, by means of a seal 76.

The seals 75 and 76 prevent the need for gas-tight and liquid-tight sealing of the hold 12 with respect to the surrounding area 44 for the purpose of preventing the spread of fumes, as already described in connection with FIGS. 3A-3E.

The web 68 of the second mounting part 24 ensures a correct positioning of the cover panel 14a along the Y axis, by extending adjacent to a peripheral edge 77 of the cover panel 14a along the Z axis up to approximately half the thickness D of the cover panel 14a.

In connection with FIGS. 5A and 5B, the construction of the oblique joint 18 (see FIG. 2) is explained in more detail below, the side panel 14b meeting the obliquely arranged panel 14c at an angle W of, for example, 135°. Only the differences with respect to the embodiment according to FIGS. 3A-3I are addressed.

FIG. 5A shows, in a perspective view VI, only a detail of the second mounting part 24 which is associated with the oblique joint 18.

The second mounting part 24 has an angle bracket 81 which comprises two arms 82 and 83. The arms 82 and 83 extend at an angle W of, for example, 135° to each other. The hooks 28 extend substantially perpendicular to the arm 82 and are arranged slightly above a connection region 84 which interconnects the arms 82 and 83. Thus, the arms 82 and 83 form an approximately Y-shaped arrangement with the hooks 28, when viewed in cross section.

Figure 5B:
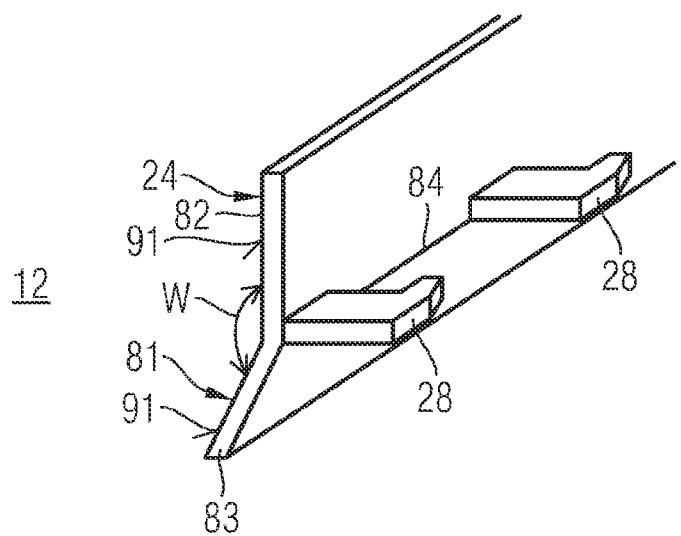
FIG. 5B is a perspective view of a first mounting part which corresponds to the second mounting part shown in FIG. 5A.
Figure 5B:
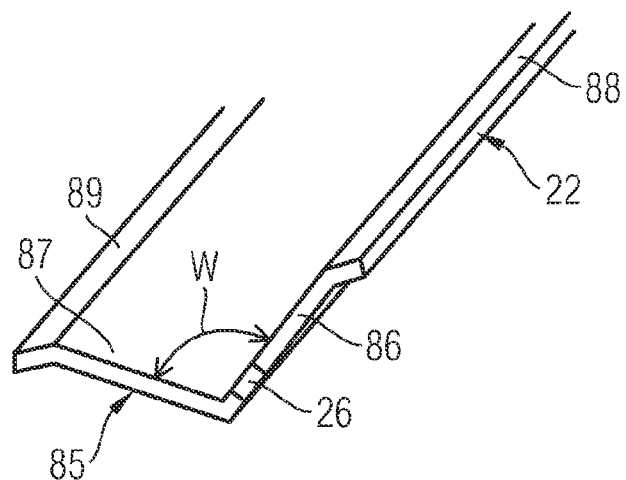

FIG. 5B shows a perspective view of a detail of the first mounting part 22 which is associated with the oblique joint 18, from the view VI from FIG. 2.

The first mounting part 22 is formed as an angle bracket 85 which has two arms 86 and 87. Portions 88 and 89 join onto the arms 86 and 87. The arms 86 and 87 likewise form an angle W of approximately 135°. The portions 88 and 89 again extend at an angle to the arms 86 and 87. The arm 86 has the slots 26.

The embodiment according to FIGS. 5A and 5B, i.e. the oblique joint represented by these, differs in its construction from the embodiments according to FIGS. 3A-3I only in that an angle bracket 85 is used instead of the U-profile 25, and an angle bracket 81 is used instead of the T-profile 27. Thus, the oblique arrangement of the side panel 14b relative to the obliquely extending panel 14c can be achieved.

Although the invention has been specifically described here with reference to embodiments, it is in no way restricted to these but can be modified in a variety of ways. In particular, it should be noted that the above-described developments and embodiments for the facing arrangement according to the invention can be applied accordingly to the aircraft or spacecraft according to the invention. Furthermore, it should be noted that "a" does not rule out a plurality in the present case. Where "below" and "above" are used in connection with the figures, this merely serves to facilitate better understanding. In just the same way, "left" or "right" may be used, or reference made to any other direction in space.

Of course, the coating 39 shown in FIG. 3D, for example, can also be applied to the profiled part 27 from FIG. 3E or to the hold-side face 90 of the arm 63 in FIG. 4D or also to the hold-side face 91 of the arms 82 and 83 in FIG. 5A.

Of course, according to its basic functional principle, the piece 56 (see FIG. 3A) can also be used in conjunction with the embodiments according to FIGS. 4A-4D or 5A and 5D. In this case, the piece 56 could also be formed in a correspondingly angular manner.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A facing arrangement for a hold of an aircraft or spacecraft, comprising:
   a first and a second panel which form a gap between an outer edge of each panel;

a first mounting part which is attachable to a primary structure of the hold and which has a plurality of locking elements; and a second mounting part which has a plurality of counter locking elements;

wherein at least one of the locking elements and the counter locking elements reaches, at least in portions, through the gap between the first and the second panel;

wherein the locking elements and the counter locking elements are locked together in order to connect the first mounting part to the second mounting part for holding the first and second panels between the first mounting part and the second mounting part; and wherein the plurality of locking elements and counter locking elements are detachably lockable and can be detached altogether with one movement of the first mounting part relative to the second mounting part in a longitudinal direction substantially parallel to the outer edges of the first and second panels, and wherein the first and second mounting parts each comprise a securing element, wherein when the first and second mounting parts are moved to a locked position, the securing elements of the first and second mounting parts are aligned in the longitudinal direction, and receive a fastening element to thereby prevent the first and second mounting parts from unlocking from each other.

2. The facing arrangement according to claim 1, wherein the first and second mounting parts hold the first and second panel between them by at least one of friction locking and positive locking.

3. The facing arrangement according to claim 1, wherein the locking elements and counter locking elements are lockable altogether with one movement.

4. The facing arrangement according to claim 3, wherein at least one of the securing elements is formed as a piece which is arranged adjacently to the second mounting part in a longitudinal direction thereof, the second mounting part together with the piece having the same length as at least one of the first mounting part and the gap.

5. The facing arrangement according to claim 4, wherein the piece is detachably fastenable to the first mounting part.

6. The facing arrangement according to claim 1, wherein the locking elements are formed as an aperture and the counter locking elements are formed as a hook which engages, from behind, an edge region bordering the aperture.

7. The facing arrangement according to claim 6, wherein the aperture is a slot.

8. The facing arrangement according to claim 1, wherein the first and second mounting parts each have a first contact face for the first panel and a second contact face for the second panel, between which contact faces the first panel and the second panel are held.

9. The facing arrangement according to claim 8, wherein the first mounting part is formed as one of a U-profile and an angle profile which has on one portion the locking elements and/or, on this portion and/or on the portions which adjoin this portion, the first and/or second contact face.

10. The facing arrangement according to claim 8, wherein a seal is arranged between at least one of the first and second contact face of at least one of the first and second mounting part and at least one of the first and second panel.

11. The facing arrangement according to claim 1, wherein the second mounting part is formed as one of a T-profile and angle profile which has on one portion the first contact face and/or the counter locking elements and/or, on its other portion, the second contact face.

12. The facing arrangement according to claim 1, wherein a portion is formed on at least one of the first and second mounting part for positioning at least one of the first and second panel in its main plane extension.

13. The facing arrangement according to claim 12, wherein the portion formed on at least one of the first and second mounting part for positioning at least one of the first and second panel in its main plane extension comprises a web.

14. The facing arrangement according to claim 1, wherein at least one of the first and second mounting part comprises a plastics material as well as a fire-retardant material which protects the plastics material from a fire in the hold.

15. The facing arrangement according to claim 14, wherein the plastics material comprises a fibre reinforced plastics material.

16. The facing arrangement according to claim 14, wherein the fire-retardant material is formed as one of an intumescent coating, a ceramic coating and a mica coating.

17. An aircraft or spacecraft comprising a hold and a facing arrangement according to claim 1, which facing arrangement lines the hold.

18. The facing arrangement according to claim 1, wherein the movement for locking or detaching respectively comprises a relative movement of the second mounting part in relation to the first mounting part.

19. The facing arrangement according to claim 18, wherein the relative movement is a movement of the second mounting part in relation to the first mounting part in longitudinal direction.

* * * * *